Jan. 20, 1931.  W. A. FRY  1,789,703
FLUID MOTOR
Filed Nov. 22, 1928  2 Sheets-Sheet 1

INVENTOR.
William A. Fry
BY

ATTORNEY.

Jan. 20, 1931.   W. A. FRY   1,789,703
FLUID MOTOR
Filed Nov. 22, 1928   2 Sheets-Sheet 2

INVENTOR.
William A. Fry
BY
ATTORNEY.

Patented Jan. 20, 1931

1,789,703

UNITED STATES PATENT OFFICE

WILLIAM A. FRY, OF PUEBLO, COLORADO

FLUID MOTOR

Application filed November 22, 1928. Serial No. 321,221.

The object of the invention is to provide a fluid motor of the rotary type susceptible of rotation in either direction by the mere change of the point of admission of the motive agent; to provide a motor of this character which is provided with a comparatively long power or pressure chamber of substantially uniform cross-sectional area throughout its length; and to provide a rotary motor in which the number of working parts is reduced to a minimum, the parts easily and effectively mounted for efficient operation and the whole susceptible of cheap manufacture and low marketing cost.

With this object in view, the invention consists in a construction and combination of parts of which a preferred embodiment is illustrated in the accompanying drawings, wherein.

Figure 1:
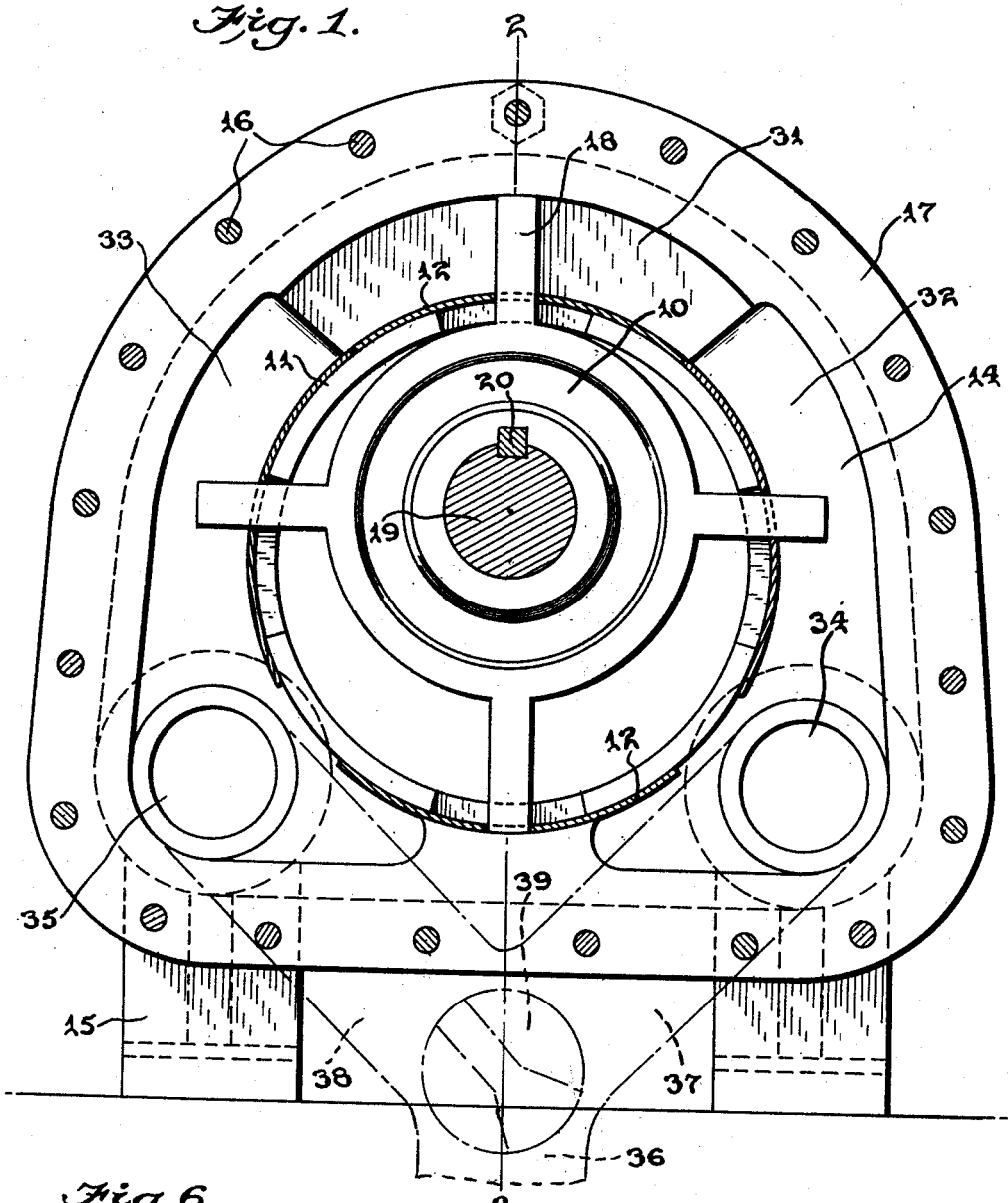
Figure 1 is a central vertical sectional view of the invention taken transversely of the rotary member.
Figure 6:
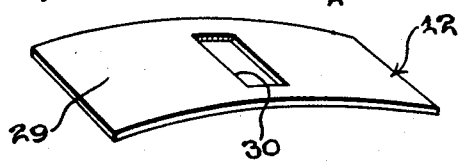
Figure 6 is a perspective view illustrating one of the oscillating plates constituting an element of the rotor assemblage.
Figure 2:
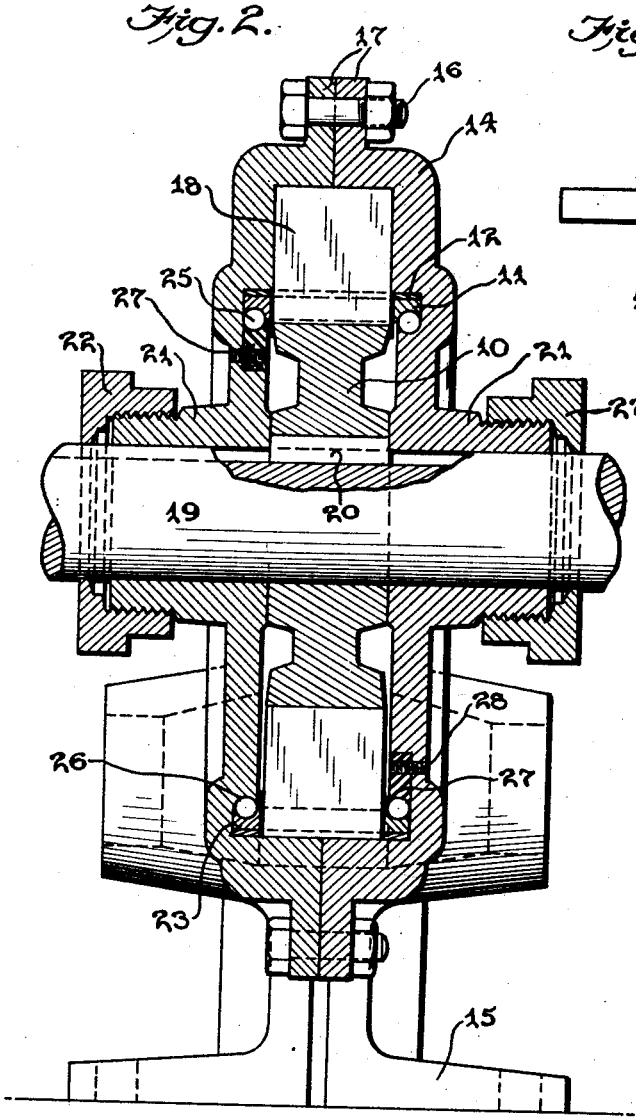
Figure 2 is a transverse vertical sectional view on the plane indicated by the line 2—2 of Figure 1.
Figure 3:
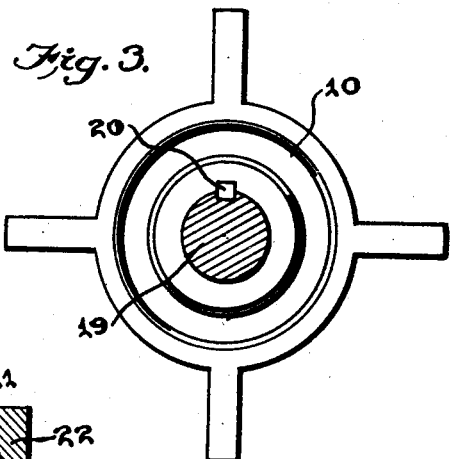
Figure 3 is a side elevational view of the rotor.
Figure 4:
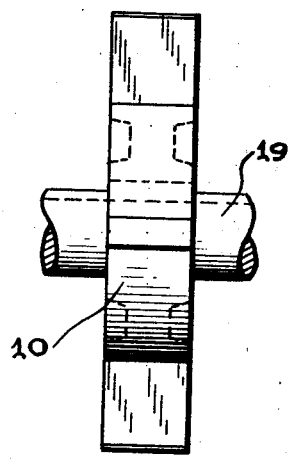
Figure 4 is an edge elevational view of the rotor.
Figure 5:
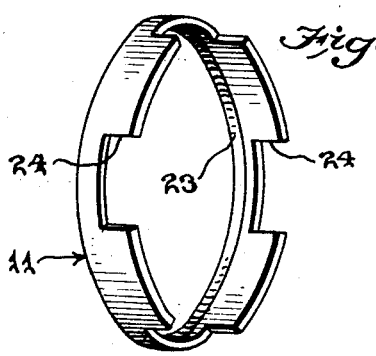
Figure 5 is a detailed perspective view illustrating one of the rotary rings operating in combination with the rotor.

The rotor, which consists of a spider 10, a ring structure 11 and oscillating plates 12, is mounted for angular or turning movement in the stator consisting of complemental case elements 14 each of which is provided with a supporting leg or foot 15 and the two of which are secured together by bolts 16 passing through registering holes in the flanges 17.

Of the rotor assemblage, the spider 10, which is provided with radially extending blades 18, is mounted on the drive shaft 19, to which it is keyed, as indicated at 20, the drive shaft rotating in bearings 21 formed in the case elements 14 and being surrounded by gland nuts 22.

The ring structure 11 is mounted for angular or turning movement in the stator but with its axis of rotation eccentric to that of the spider. The ring structure consists of a pair of complemental rings 23 formed with lateral slots 24 uniformly spaced angularly and of a number agreeing with the number of blades 18 on the spider. Each ring 23 is carried on balls 25, the balls being in turn carried in races 26 formed in lateral slots in the case elements 14. Inserts 27 are set in the case elements adjacent the races, being detachably secured in place by means of screws 28, and, when these inserts are detached and the rings 23 positioned, the balls may be inserted until the full complement is supplied, when the inserts may be reattached.

The two rings 23 carried by the two case elements are in edge engagement when the case elements are assembled and the slots 24, registering, provide clearing spaces for the blades 18 of the spider, the body portion of the spider being surrounded by the ring structure and the blades extending through the same. Since the ring structure is eccentric to the spider, it is necessary that the slots 24 be of sufficient angular extent to provide binding engagement between the spider and the ring structure and this would result in leakage of the motive agent through the slots, were it not for the arcuate oscillating plates 29 which are provided with slots 30 through which the blades 18 extend. The plates 29 conform to the outer periphery of the ring structure as a whole and are of a width equal to the combined width of the two rings 23, so that they extend into the slots of the case members 14 in which the rings are mounted and thus effectively cover the slots 24 in the rings 23.

The case members 14 are constructed to form, when assembled, a work chamber 31 and inlet and outlet chambers 32 and 33, these latter two changing in function depending upon the direction of rotation of the rotor. Each case member is provided with nipples 34 and 35 in communication with the chambers 32 and 33 respectively. The purpose of this arrangement is to connect the nipples 34 and 35 of one case member to a motive agent supply source and the corresponding nipples of the other case member to an exhaust pipe. In Figure 1 this arrangement is suggested in dotted lines, the intake pipe 36 being provided with the branches 37 and 38 connected with the nipples 34 and 35 respectively and the pipe 36 at its juncture with the branches having a two-way valve 39 for selectively directing the motive agent through the nipples 34 or 35. The other case element is correspondingly equipped, so that when the nipple 35 of the one constitutes the intake the nipple 34 of the other constitutes the exhaust, and vice versa.

The work chamber 31 for an approximate angular distance of 97° reckoned with the axis of the shaft 19 as the center is of a width corresponding to the width of the blades 18. The outer or arcuate wall of this chamber is formed on a radius corresponding to the radial extent of the blades 18. The lower arcuate wall of the chamber 31, however, is formed by the oscillatory plates 29 and, therefore, the chamber is not quite as high at its extremities as at its center but to all practical intent is of uniform cross-section throughout its angular extent. The chambers 32 and 33, however, are wider than the chamber 31 and, irrespective of which of these is employed as the admission chamber for the motive agent, the latter is directed to the chamber 31 in which at least one of the blades 18 is positioned and will prevent the passage of the motive agent without the application of a turning force to the spider.

By reason of the eccentric mounting of the spider and ring structure, the blades have the effect of moving radially, inwardly and outwardly of the ring structure, having always the greatest radial extent beyond the ring structure when they are positioned in the chamber 31 where they are subject to the pressure of the motive agent.

The invention having been described, what is claimed as new and useful is:

1. A rotary motor comprising a stator and a rotor, the former being divided into admission and exhaust chambers and a work chamber interposed between the two, the rotor consisting of a spider provided with blades traversing the work chamber, and a ring in surrounding relation to the spider and mounted for rotary movement eccentrically of the same, the ring having clearance slots for the blades of the spider and arcuate plates conforming to and bearing upon the outer periphery of the ring and having slots through which the blades of the spider project.

2. A rotary motor comprising a stator and a rotor, the former being divided into admission and exhaust chambers and a work chamber interposed between the two, the rotor consisting of a spider provided with blades traversing the work chamber, and a ring in surrounding relation to the spider and mounted for rotary movement eccentrically of the same, the ring having clearance slots for the blades of the spider and arcuate plates conforming to and bearing upon the outer periphery of the ring and having slots through which the blades of the spider project, the ring being mounted on ball bearings seated in races formed in slots in opposite walls of the stator and said arcuate plates extending into said slots.

In testimony whereof he affixes his signature.

WILLIAM A. FRY.